Feb. 23, 1965  A. MANOOGIAN  3,170,488
MIXING VALVE
Filed Sept. 30, 1963  2 Sheets-Sheet 1
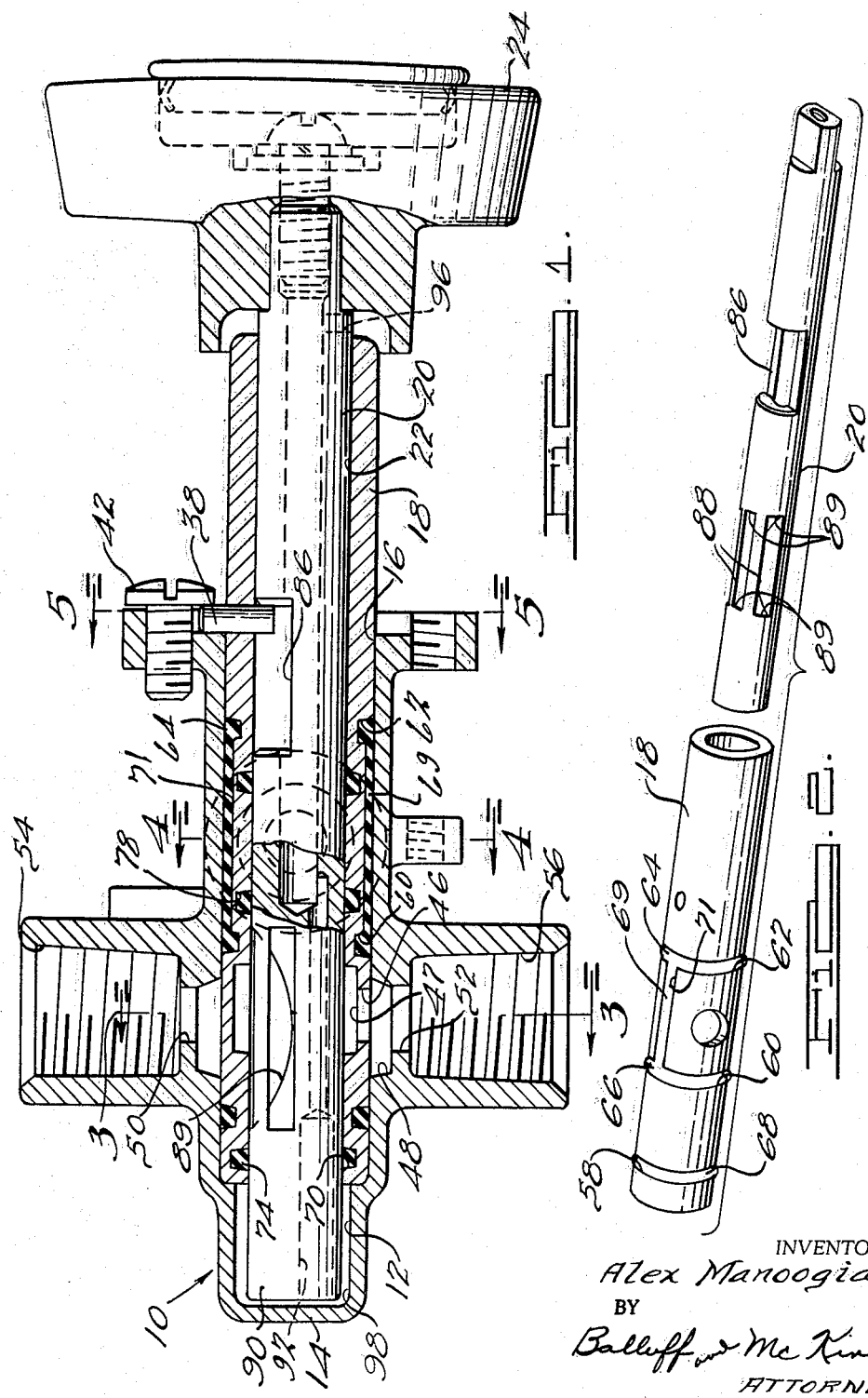
INVENTOR.
Alex Manoogian.
BY
Balluff and McKinley
ATTORNEYS.

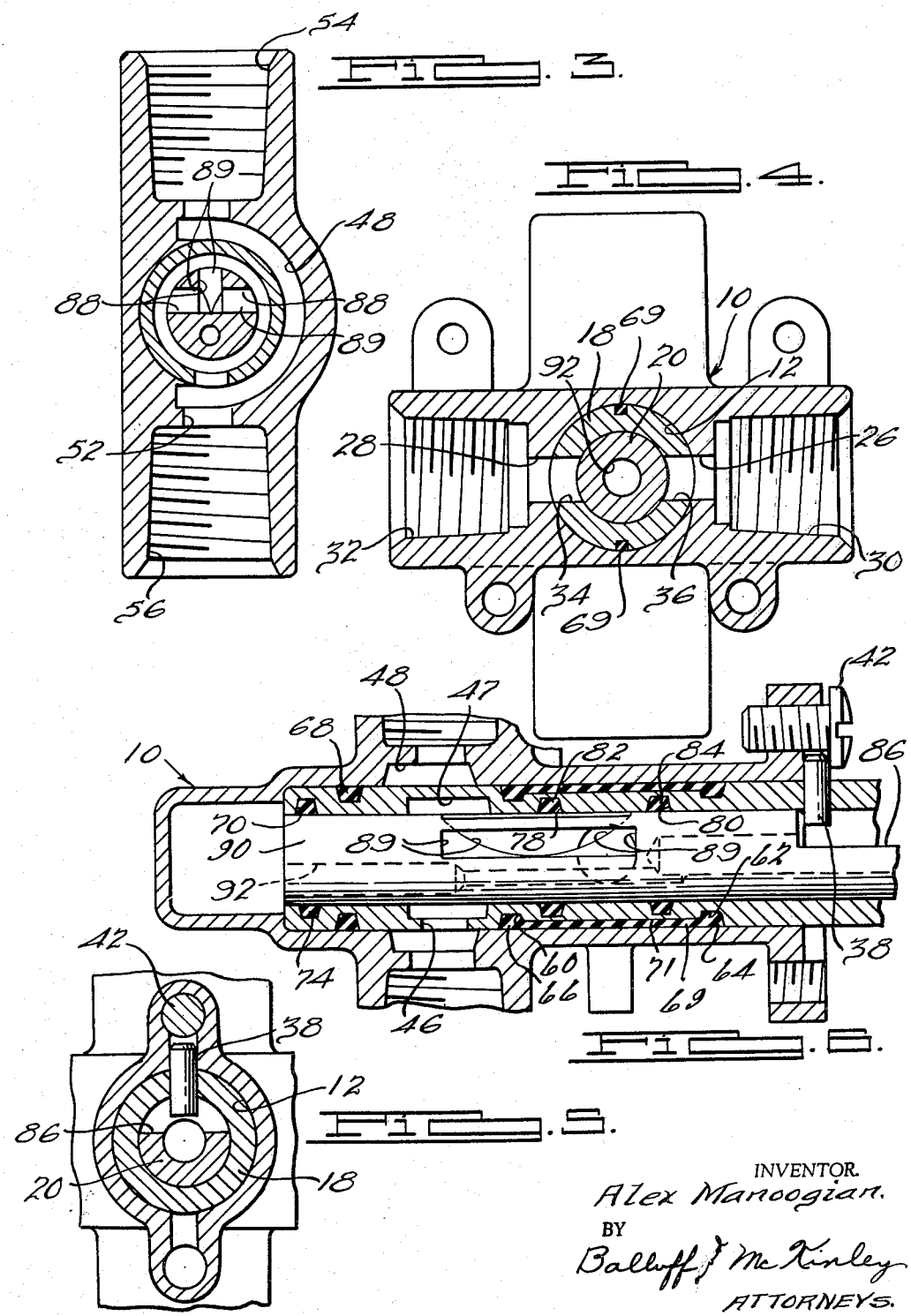

3,170,488
MIXING VALVE
Alex Manoogian, Detroit, Mich., assignor, by mesne assignments, to Masco Corporation, Detroit, Mich., a corporation of Michigan
Filed Sept. 30, 1963, Ser. No. 312,744
7 Claims. (Cl. 137—625.17)

This invention relates to mixing valves for regulating the mix of hot and cold water and the discharge thereof, and has particular reference to a single handle mixing valve wherein the handle is rotatable to vary the mix and movable in and out to modulate the flow.

A principal object of the invention is to provide a novel, simple, easy to operate, compact, and dependable single handle mxing valve of the push-pull type which can be efficiently produced at a more favorable cost than mixing valves of this type which are now commercially available.

Other and further objects of the invention will be apparent from the following description and claims and may be understood by reference to the accompanying drawings, of which there are two sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

FIG. 1 is a longitudinal sectional view of a shower model of a mixing valve embodying the invention, shown in its closed or off position;

FIG. 2 is an exploded view of the valve sleeve and the valve member apart from the valve body;

FIG. 3, 4 and 5 are sectional views taken along the lines 3—3, 4—4, and 5—5 respectively of FIG. 1; and FIG. 6 is a fragmentary sectional vew similar to FIG. 1 but showing the valve in an open position.

The valve as illustrated comprises a body 10 having a bore 12 closed at one end 14 and open at the other end 16, a sleeve 18 lining the bore 12 and projecting from the open end thereof, a rotatable and axially movable valve stem or member 20 having a sliding fit in the bore 22 of the sleeve 18 and projecting from one end thereof, and a knob or handle 24 mounted directly on the projecting end of the valve member 20 for rotating the same to control the mix and for axially moving the same to modulate the flow between full open and full closed positions. The valve thus comprises four major parts: the body 10 which may be a brass casting, the sleeve 18 which may be brass with a finished surface such as chrome plating, the valve stem or member 20 which may be brass with a finished surface such as chrome plating, and the handle 24 which may be plastic.

As shown more clearly in FIG. 4, the body or housing 10 is provided with oppositely disposed inlets 26 and 28 for the hot and cold water, the inlets opening into the bore 12 at their inner ends and communicating at their outer ends with threaded sockets 30 and 32 whereby the valve may be connected in fluid flow relation with hot and cold water pipes. The outside of the sleeve 18 has a close fit in the bore 12, the surface of which is smooth, and the sleeve 18 is provided with oppositely disposed inlet ports 34 and 36 in fluid flow relation with the inlets 26 and 28.

A laterally projecting pin 38 carried by the sleeve 18 is held in place by a screw 42 whereby the sleeve 18 is fixedly secured in the bore 12. The sleeve 18 is further provided with an outlet port 46 which at its outer end communicates with an inner annular groove 48 in the body 10. The axial spacing of the inlet ports 34, 36 and the outlet port 46 is not great, whereby the required axial movement of the stem 20 to open and close the valve and modulate the flow is small. The groove 48 is in open communication with ports 50 and 52 in the body 10 which communicate with threaded sockets 54 and 56 whereby the discharge side of the valve may be connected to the pipes leading to a tub and to a shower spray.

It is conventional to mount a mixing valve above the tub spout and below the shower spray, and thus when the shut-off valve (not shown) associated with the tub spout is open, water will flow into the tub, whereas when such last-mentioned valve is closed, the water will flow out through the shower spray. However, the specific manner in which the mixing valve of my invention is hooked up with a water system forms no part of my invention, and I contemplate that instead of two outlet ports 50 and 52, only one of such outlet ports might be employed where a single discharge will suffice.

The outer surface of the sleeve 18 is relieved to provide a series of annular sealing grooves 58, 60 and 62, each of which accommodates an annular sealing ring, such as an O-ring. As shown in FIGS. 1 and 2, each of the O-rings 64, 66 and 68 disposed in such grooves provides an effective seal between the outer surface of the sleeve 18 and the bore 12 of the body 10. It will be observed that the O-rings 66 and 68 straddle the outlet ports 50 and 52 while the O-rings 64 and 66 straddle the inlet ports 34 and 36. The O-rings 64 and 66 preferably are formed integrally with opposed connecting links 69, the links 69 being disposed in grooves 71 which extend axially between the grooves 60 and 62. The links 69 form an axially extending seal between the sealing rings 64 and 66 so as to prevent cross flow between the hot and cold water inlets through any clearance that may exist between the outside of the sleeve 18 and the inside of the bore 12.

The sleeve 18 is also provided with internal annular groove 70, 78 and 80 which accommodate O-ring seals 74, 82 and 84. The O-ring seals 74, 82 and 84 have sealing engagement with the sleeve 18 and with the outer surface of the valve member 20 which is rotatable and axially movable in the bore 22 of the sleeve, the member 20 having a close sliding fit therein. Preferably during assembly the outside of the valve member 20 is coated with a water insoluble grease so as to reduce the friction between the valve member 20 and the bore 22 of the sleeve 18.

The O-rings 82 and 84 are so spaced that in the closed position of the valve as shown in FIG. 1, such O-rings straddle the inlet ports 34 and 36 of the sleeve so as to prevent leakage of the valve in its closed position.

The valve member 20 is provided with a cut-out or flat 86 which cooperates with the inner end of the pin 38 to limit the rotation of the valve member 20 and the axial movement thereof. The valve member 20 is provided with a series of longitudinally extending cut-out portions 88 which in the closed position of the valve are out of communication with either of the inlet ports 34 or 36, but in communication with the outlet port 46 as shown in FIG. 1 through the annular groove 47 internally provided in the sleeve 18. In the closed position of the valve member 20 the inner end 90 thereof is bottomed in or closely adjacent the bottom of the closed end 14 of the bore 10. Movement of the valve member 20 from the position shown in FIG. 1 to that shown in FIG. 6 will bring the cut-out portions 88 into communication with the inlet ports 34 and 36. However, the cut-out portions 88 will always be in fluid flow relation with the annular groove 47 in the sleeve and through it with the outlet port 46 in the sleeve. The valve member 20 may be rotated so as to bring the cut-out portions 88 into fluid flow relation with the inlet port 34 only, or the inlet port 36 only, or with both of the inlet ports 34 and 36 to the same or different extent so as to control the ratio of the mix which flows through the inlet ports 34 and 36 and the cut-out portions 88 into the annular groove 47 and through the discharge outlet 46. Thus it is possible by rotating the handle 24 to vary the mix from 100% hot to 100% cold without modulating the flow, and by axial movement of the valve member 20 to modulate the flow without changing the mixture ratio, or by combined axial and rotational movement to modulate the flow while varying the mixture ratio.

It will be evident that as the valve member 20 moves from the position illustrated in FIG. 6 to that of FIG. 1, the area of the cut-out portions 88 exposed to the inlet ports 34 and 36 will be gradually reduced, thereby reducing the volume of flow from wide open position to zero flow, as shown in FIG. 1.

The transverse surfaces 89 of the stem which form the ends of the cut-out portions 88 are of equal effective area and oppositely disposed, whereby the axial pressure on the valve member 20 exerted by the fluid in the cut-out portions 88 is neutralized, thereby balancing the valve; that is, the mixing valve is so designed that the water pressure exerts no force on the stem or valve member 20 tending to move it from a set position or to resist movement of the stem 20. Because of this, it is not necessary to use high friction sealing means to prevent the valve member 20 from shifting under the influence of water pressure, and the resistance to manual movement of the valve member 20 can be relatively low. This is important because it contributes to the life of the sealing means.

The valve member 20 is provided with an atmospheric vent passage 92 which extends from the inner end 90 of the valve stem to the other end of the stem upon which the handle 24 is mounted. A duct 96 extends between the passage 92 and the outside of the stem 20 exteriorly of the sleeve 18 so that the well 98 at the inner end of the bore 12 is vented to atmosphere. It will be observed that all of the seals are carried by the valve sleeve 18 which is removable from the body 10 upon removal of the screw 42.

Except for the cut-out portions 88 and 86, the stem is of uniform cross section and may be made of a round piece of bar stock. The sleeve 18 is also of uniform cross section except for the ports and grooves, and may be made from a piece of tubing. The over-all diameters of the sleeve 18 and valve member 20 may be relatively small. The relatively long sleeve 18 and valve member 20 provide substantial area for slidably supporting the member 20 and minimize the effect of side thrust to which the stem may be subjected in use.

This application is a continuation-in-part of my prior copending application Serial No. 212,352, filed July 25, 1962, now abandoned, for "Mixing Valve."

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A mixing valve comprising a body having a bore closed at one end and open at the other and inlets communicating with said bore, a sleeve lining said bore and projecting from the open end thereof and provided with inlet ports in fluid flow relation with said inlets, sealing means between the outside of said sleeve and said bore forming a seal therebetween and between which said inlet ports are disposed, the interior of said sleeve forming a valve bore of uniform section throughout its length, a movable cylindrical valve member having a sliding fit in said sleeve bore and projecting from one end thereof, said sleeve having an outlet port, said body having an outlet port in fluid flow relation with said sleeve outlet port, said valve member being relieved along a portion of its length to form a mixing passage along one side thereof adapted to be selectively positioned by axial and rotational movement so as to provide a fluid flow passage between either or both of said inlet ports in said sleeve and said outlet port thereof depending upon the orientation of said passage relative to said ports, a series of annular sealing means between said valve member and sleeve to prevent fluid flow axially along said sleeve except through said relieved portion, said series including spaced annular seals between said sleeve bore and said valve member and positioned so as to straddle the inlet ports in said sleeve in the closed position of said valve member, the relieved portion of said valve member providing equal and oppositely disposed transverse surfaces exposed to the fluid pressure of the liquid flowing through the valve when open so as to neutralize the axial thrust exerted on the valve member by such fluid pressure, said valve member in its closed position being in communication with only said outlet port in said sleeve.

2. A mixing valve according to claim 1 wherein said relieved portion of said valve member comprises a series of intercommunicating relatively narrow axially extending slots.

3. A mixing valve according to claim 1 wherein said sealing means between said sleeve and said valve member are carried by said sleeve in grooves on the interior surface thereof.

4. A mixing valve according to claim 1 wherein said sleeve is provided with an internal annular groove which communicates with the outlet port in said sleeve and with said recessed portion of said valve member in all positions of the latter.

5. A mixing valve according to claim 1 including a pin carried by said sleeve which forms part of a locking means for securing said sleeve in said body bore, the inner end of said pin cooperating with a flat on said valve member to limit the rotational and axial movement thereof relative to said sleeve.

6. A mixing valve according to claim 1 wherein said valve member includes a duct which provides an atmospheric vent for the closed end of the bore in said body.

7. A mixing valve according to claim 1 wherein said body bore includes a shoulder spaced from the closed end of said bore on which said sleeve is seated and wherein said valve member projects beyond the end of said sleeve into the closed end of said bore.

References Cited in the file of this patent

UNITED STATES PATENTS

| 2,987,079 | Page | June 6, 1961 |
| 3,026,907 | Klinger | Mar. 27, 1962 |
| 3,103,231 | Moen | Sept. 10, 1963 |